Sept. 27, 1955  C. H. V. KIEBERT  2,718,781
APPARATUS FOR BALANCING A WHEEL
Filed Aug. 25, 1952  2 Sheets-Sheet 1
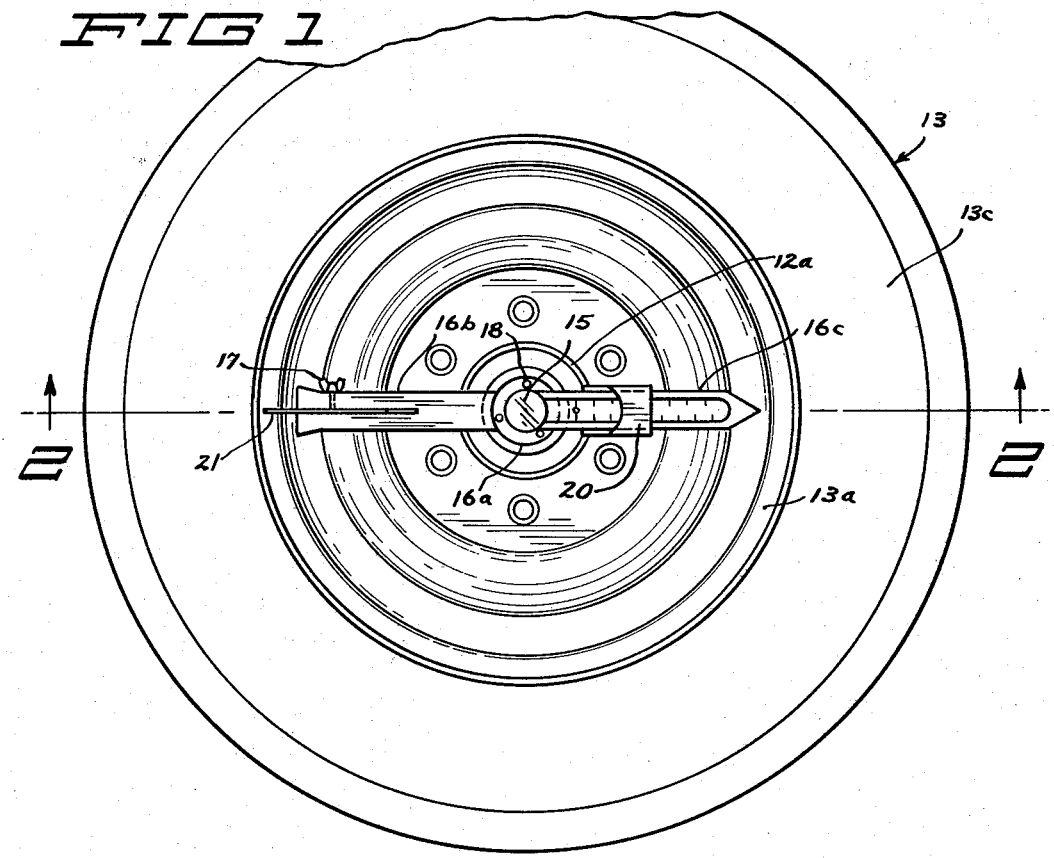
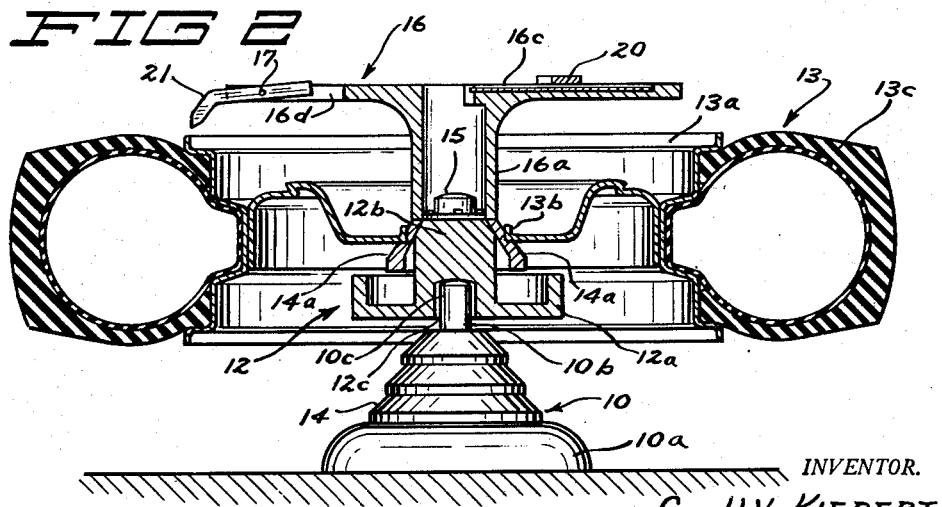
INVENTOR.
Coe H. V. Kiebert
BY
Attorney Sept. 27, 1955  C. H. V. KIEBERT  2,718,781
APPARATUS FOR BALANCING A WHEEL
Filed Aug. 25, 1952  2 Sheets-Sheet 2
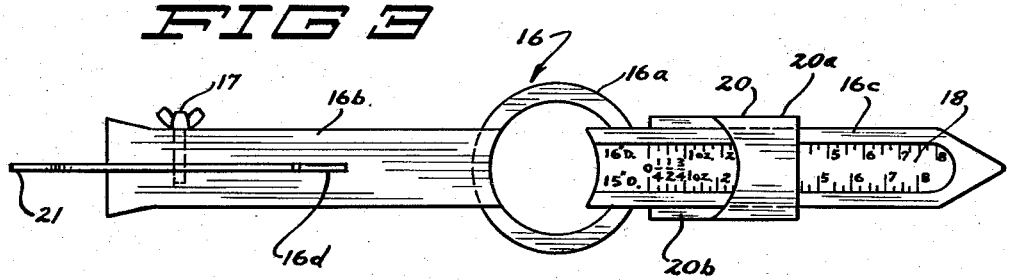
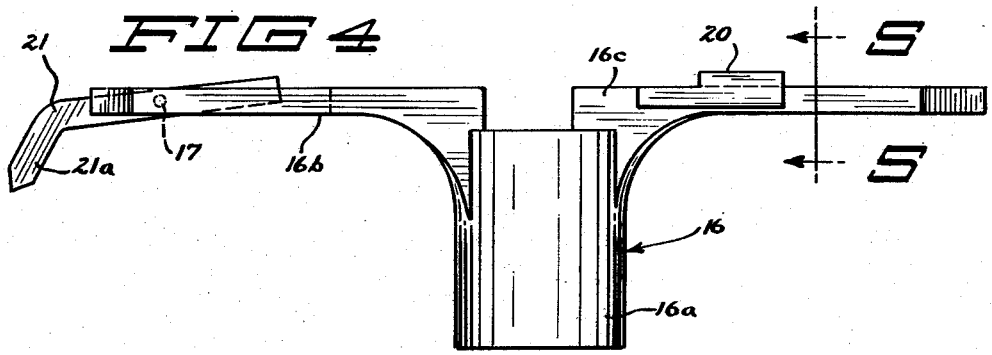
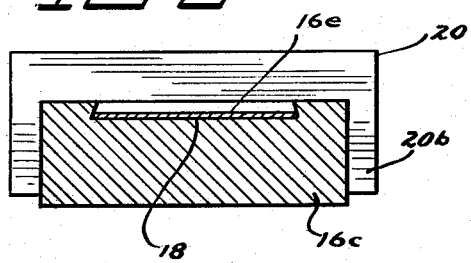
INVENTOR.
COE H. V. KIEBERT
BY Chas. C. Reif
ATTORNEY United States Patent Office 2,718,781
Patented Sept. 27, 1955

2,718,781

APPARATUS FOR BALANCING A WHEEL

Coe H. V. Kiebert, Minneapolis, Minn.

Application August 25, 1952, Serial No. 306,149

2 Claims. (Cl. 73—66)

This invention relates to an apparatus to be used for balancing wheels of automotive vehicles. Generally the present practice is to use a trial and error method for balancing such wheels. Such a practice is time consuming and relatively costly. It is desirable to have an apparatus which is adapted to quickly and accurately indicate the correction required to balance such a wheel.

It is an object of this invention to provide a device adapted to be used for quickly and accurately indicating the correction required to balance the wheel of an automotive vehicle.

It is another object of this invention to provide a device adapted to be used for balancing a wheel of an automotive vehicle having in combination, a member adapted to support said wheel, means for indicating out of balance condition of said wheel, and means for indicating the amount of weight required to be added to said wheel to place said wheel into a balanced condition.

It is more specifically an object of this invention to provide a device adapted to be used for balancing a wheel of an automotive vehicle having in combination, a member for supporting said wheel, a member for supporting said last mentioned member at its central point, means for indicating an out of balance condition in said wheel, a member for indicating the portion of said wheel where correction is required, and means for indicating the amount of weight required to place said wheel into a balanced condition.

These and other objects and advantages of the invention will be fully set forth in the following description made in connection with the accompanying drawings in which like reference characters refer to similar parts throughout the several views and in which:

Fig. 1 is a plan view of applicant's device in operating position;

Fig. 2 is a view in vertical section taken on line 2—2 of Fig. 1, as indicated by the arrows, some parts being shown in side elevation;

Fig. 3 is a plan view of a portion of applicant's device;

Fig. 4 is a view in side elevation of said device shown in vertical section; and Fig. 5 is a view taken on line 5—5 of Fig. 4, as indicated by the arrows.

Referring to the drawings, a member 10 is shown having a base portion 10a and a supporting member 10b integral with said base portion and upstanding centrally therefrom. Portion 10a is shown as being substantially cylindrical with rounded corners. Member 10b is shown as being cylindrical with a rounded upper end surface 10c.

A cup-shaped wheel supporting member 12 is provided having a rim portion 12a and having a cylindrical portion 12b upstanding centrally therefrom and integral therewith terminating in a flat top portion. Member 12 has a cylindrical recess 12c extending upwardly from its bottom for some distance and having a top of slightly concave form. Said recess has a diameter somewhat greater in extent than the diameter of member 10b. Said top of recess 12c rests on top of member 10b. Secured to the upper flat top of member 12b is a bubble level 15 and the same is fastened to said flat top of member 12b by screws 18.

A series of cones or frusto-conical shaped members 14 are provided. Said members are centrally bored so as to be adapted to fit over member 12b. Said members 14 are adapted to nest in superposed position on member 10, as shown in Fig. 2. Said members 14 vary in size so as to be respectively adapted to support wheels having different sized hubs. Referring to Fig. 2 another cone-shaped member 14a is shown in position resting on member 12. Again referring to Fig. 2, a wheel 13 is shown in position on said member 14a. Said wheel 13 is a common variety of a wheel used on automotive vehicles and comprising a rim 13a, hub 13b and a tire 13c.

The parts so far described are old and now of commerce. According to the present invention a member 16 is shown. Said member has a hub portion 16a and extending upwardly thereof and oppositely therefrom are a pair of substantially rectangular elongated members 16b and 16c. Hub 16a is adapted to rest on member 14a.

Member 16b has a slightly widened outer end portion and has a central vertical slot 16d extending inwardly from its outer end for some distance. A set screw 17 is disposed in one side of member 16b and is adapted to communicate with said slot 16d. Adapted to be disposed in said slot 16d and pivotally secured therein by set screw 17 is a gauge member 21. Said member 21 is shown as an elongated strip of small thickness having a downwardly inclined outer and substantially pointed end portion 21a.

Member 16c extending oppositely of said member 16b has an inner end portion extending inwardly of said hub portion 16a for a short distance. The inner ends of said members 16b and 16c are concavely curved in horizontal cross section. Member 16c has a pointed outer end portion. Formed in the upper side of said member 16c is a comparatively wide shallow slot 16e having its sides inclined inwardly upwardly. Disposed in said slot is a member 18. Said member 18 in the embodiment of the invention as illustrated is made of thin stiff sheet material having two sets of graduations on its upper surface respectively adapted to be used with different diameters of wheels, such as 15 inch and 16 inch wheels. Carried on member 16c and movable longitudinally thereof is a weight 20. In the embodiment of the invention as illustrated, said weight has an upper portion 20a generally rectangular in plan with a concavely curved inner edge portion. Depending therefrom and movable along the sides of member 16c are runner portions 20b. Said scale is calibrated so that said weight will indicate the number of ounces of weight which must be applied to a rim of a wheel to bring the same into balance.

In operation, a cone 14a which is of the proper size to fit the hub and support the wheel to be balanced is preselected. A wheel 13 to be balanced is then placed in operating position with its hub being positioned on member 14a and the inner side of said wheel is faced upwardly. Member 16 is next placed in position on member 14a and it rests on the upper surface thereof. Members 16b and 16c balance member 16 very nicely. It is seen that member 12, wheel 13 and member 16 are all resting as a unit on the upper rounded surface portion 10c and are oscillatable vertically in any plane. Said wheel 13 will tip downwardly the greatest extent at the point where it is most out of balance. However great or slight the out of balance condition will be, it will be indicated by the bubble level 15. Member 16 will then be turned so as to point in diametrical alignment with the bubble in said level. Member 16 could also be turned so as to be in diametral position between the high and low side of the wheel. This can be done by moving the pointer 21 to the low side of the wheel or moving the arm 16c to the high side of the wheel. Next the weight 20 is moved outwardly along member 16c until the bubble in said level comes to rest in the center of said level, thus indicating that the wheel is in balance. To secure the exact point of balance in relation to the circumference of the wheel and to place said bubble in the center of said level, it may be necessary to rotate said member 16 slightly in one direction or the other. The exact balance point is quickly found and the wheel will then be in a horizontal plane. In the event the rim of the wheel is sprung out of alignment in a single plane, this will be indicated by member 21. Said member 21 is positioned to have its lower point in close proximity to the upper surface of the outer edge portion of the rim. The wheel is rotated and said gauge member will indicate how the rim varies from being in said single plane. Pointer 21 thus really has two functions. It can be used to determine the position of the member 16 before adjusting the weight and it can be used to indicate whether the rim is sprung or out of one plane.

Thus it is seen that I have provided a simple and efficient device for balancing wheels of automotive vehicles and the use of my device provides a substantial savings of time over presently used methods and apparatus for balancing said wheels. Applicant's device has been amply tested in actual practice and has been found to be very successful in operation and is now being produced on a commercial basis.

It will of course be understood that various changes may be made in the form, details, arrangement and proportions of the apparatus without departing from the scope of applicant's invention, which, generally stated, consists in an apparatus capable of carrying out the objects above set forth, such as disclosed and defined in the appended claims.

What is claimed is:

1. A device for balancing a wheel of an automotive vehicle having in combination, a plate-like base member, a rod-like supporting member fixed thereto and upstanding therefrom extending upwardly for a distance less than the diameter of said base member, a cup-shaped member resting freely on said supporting member and being rotatable thereon and having a stem extending upwardly axially thereof having a beveled upper edge portion, a frusto-conical-shaped member supported on said beveled edge portion and having an axial opening therein being disposed about said stem and being rotatable therewith and adapted to support a wheel thereabout, a cylinder resting on said frusto-conical-shaped member above said wheel and having an arm formed as a pointer extending radially therefrom, a scale on said arm, a balance weight on said arm movable over said scale between the axis of said wheel and the end of said arm whereby said arm may be pointed in the direction of the highest point of the plane of said wheel above a horizontal plane and said weight may be moved on said arm over said scale to determine the weight necessary to balance said wheel in a plane perpendicular to its central axis.

2. A device for balancing a wheel of an automotive vehicle having in combination, a plate-like base member, a rod-like supporting member fixed thereto and upstanding therefrom extending upwardly for a short distance above the lower surface of said base member, a cup-shaped member resting freely on said supporting member and being rotatable thereon having an upper stem portion having a beveled upper end and having a flat upper surface, a cylindrical member having a bubble level therein and having a flange thereabout being secured to said upper surface of said stem, a frusto-conical-shaped member having an axial opening therein supported on said beveled upper end and disposed about said stem, the same being rotatable therewith and adapted to support a wheel thereabout, a cylinder resting on said frusto-conical-shaped member above said wheel and having its lower end portion disposed about said flange to prevent any transverse movement and having an arm formed as a pointer extending radially therefrom, a scale on said arm, a balance weight on said arm movable over said scale between the axis of said wheel and the end of said arm whereby said arm may be pointed in the direction of the highest point of the plane of said wheel above a horizontal plane and said weight may be moved on said arm over said scale to determine the weight necessary to balance said wheel in a plane perpendicular to its central axis.

References Cited in the file of this patent

UNITED STATES PATENTS

| | | |
|---|---|---|
| 2,176,269 | Morse | Oct. 17, 1939 |
| 2,462,266 | Howard | Feb. 22, 1949 |
| 2,631,452 | Hutter | Mar. 17, 1953 |